United States Patent
Siegel

(10) Patent No.: US 7,805,431 B2
(45) Date of Patent: Sep. 28, 2010

(54) SYSTEM AND METHOD FOR GENERATING A DISPLAY OF TAGS

(75) Inventor: Hilliard Bruce Siegel, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 722 days.

(21) Appl. No.: 11/478,774

(22) Filed: Jun. 30, 2006

(65) Prior Publication Data

US 2008/0114778 A1 May 15, 2008

(51) Int. Cl.
*G06F 17/30* (2006.01)
(52) U.S. Cl. .................. 707/708; 705/26; 705/27
(58) Field of Classification Search .......... None
See application file for complete search history.

(56) References Cited

U.S. PATENT DOCUMENTS

| | | | |
|---|---|---|---|
| 5,721,911 A | 2/1998 | Ha et al. | |
| 7,010,484 B2* | 3/2006 | Lin | 704/240 |
| 2003/0093790 A1 | 5/2003 | Logan et al. | |
| 2003/0126026 A1* | 7/2003 | Gronberg et al. | 705/26 |
| 2005/0010933 A1 | 1/2005 | Vaught | |
| 2005/0114357 A1* | 5/2005 | Chengalvarayan et al. | 707/100 |
| 2006/0129564 A1* | 6/2006 | Shah et al. | 707/10 |
| 2006/0242554 A1* | 10/2006 | Gerace et al. | 715/501.1 |
| 2007/0226077 A1* | 9/2007 | Frank et al. | 705/27 |
| 2007/0271297 A1* | 11/2007 | Jaffe et al. | 707/104.1 |

OTHER PUBLICATIONS

PCT International Search Report dated Mar. 12, 2008 from corresponding PCT Application Serial No. PCT/US07/72362, 3 pages.

* cited by examiner

*Primary Examiner*—Apu M Mofiz
*Assistant Examiner*—Anteneh Girma
(74) *Attorney, Agent, or Firm*—Lee & Hayes, PLLC

(57) ABSTRACT

A system for generating a display of a tag options to a user wishing to tag an item includes a computer-implemented database for storing information related to various tags. Upon receiving a request for tags for an item, the system evaluates each tag associated with the item, and selects tag options to be displayed to the user based on the evaluations of the tags. The group of selected tags is displayed to the user in an order based on the evaluations.

31 Claims, 11 Drawing Sheets

SYSTEM AND METHOD FOR GENERATING A DISPLAY OF TAGS

BACKGROUND

Network systems such as the Internet provide users with access to large amounts of information. In order to allow network users to find and organize information on network systems that is relevant to specific subject matter topics, various techniques have been developed. One such technique involves the use of "tags" and network-based tag services.

A tag may be a word or group of words that may be assigned to one or more items (e.g., files, documents, web pages on the Internet, items displayed via a web-based retail store, digital photographs displayed via a network, bookmarks, etc.). Tags may be used by users of a network system to, among other things, classify items, for example, by tagging a group of photographs with the tag "snow," and search for items, for example, by searching for photographs related to winter, using a tag-based search, and entering the tag "winter." Often, a single tag may be assigned to multiple items, and a single item may be associated with multiple tags.

A tag service may be used in a variety of environments (e.g., as a part of a web-based retail operation providing shoppers with the ability to tag specific items). The items being tagged may be provided by the network system, or by users of the network system, or by another entity. Typically, the tags to be assigned to the item or items are chosen by users of the network system.

Upon tagging an item, certain information may be made available to other users of the tag service (e.g., users may have access to items tagged by other users with a given tag). This may be a particularly useful feature when, for example, conducting web-based searches because tag-based searches generally generate results already deemed somehow relevant (i.e., "tagged") by other users.

While tagging may be useful for classification and searches, tagging has some disadvantages. Because tag services depend on users to assign tags to items, there exists the potential that users may use tags that are meaningful only to the specific user (e.g., a person's nickname), and are not particularly useful or meaningful to users in general for purposes of tag-based searching, categorization, etc. In addition, there is typically no information about the meaning or semantics of a tag. For example, the tag "apple" may refer to a fruit, a person, or a computer. As a result, many unhelpful tags may be presented to users.

It would therefore be desirable to have a system that displays higher quality or more useful tags more prominently or more frequently than other tags to users. Other features and advantages will be made apparent from the present specification. The teachings disclosed extend to those embodiments that fall within the scope of the appended claims, regardless of whether they satisfy one or more of the above-identified needs.

SUMMARY

One embodiment of the invention relates to a computer-implemented system for generating a display of tag options for an item. The system stores all of the tags that are assigned to the item in a computer-implemented database. Upon receiving a request to display tag options for a particular item, the system evaluates each of the tags that are assigned to the item, and generates the display of tag options based on the evaluation of the tags.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION

Figure 1:
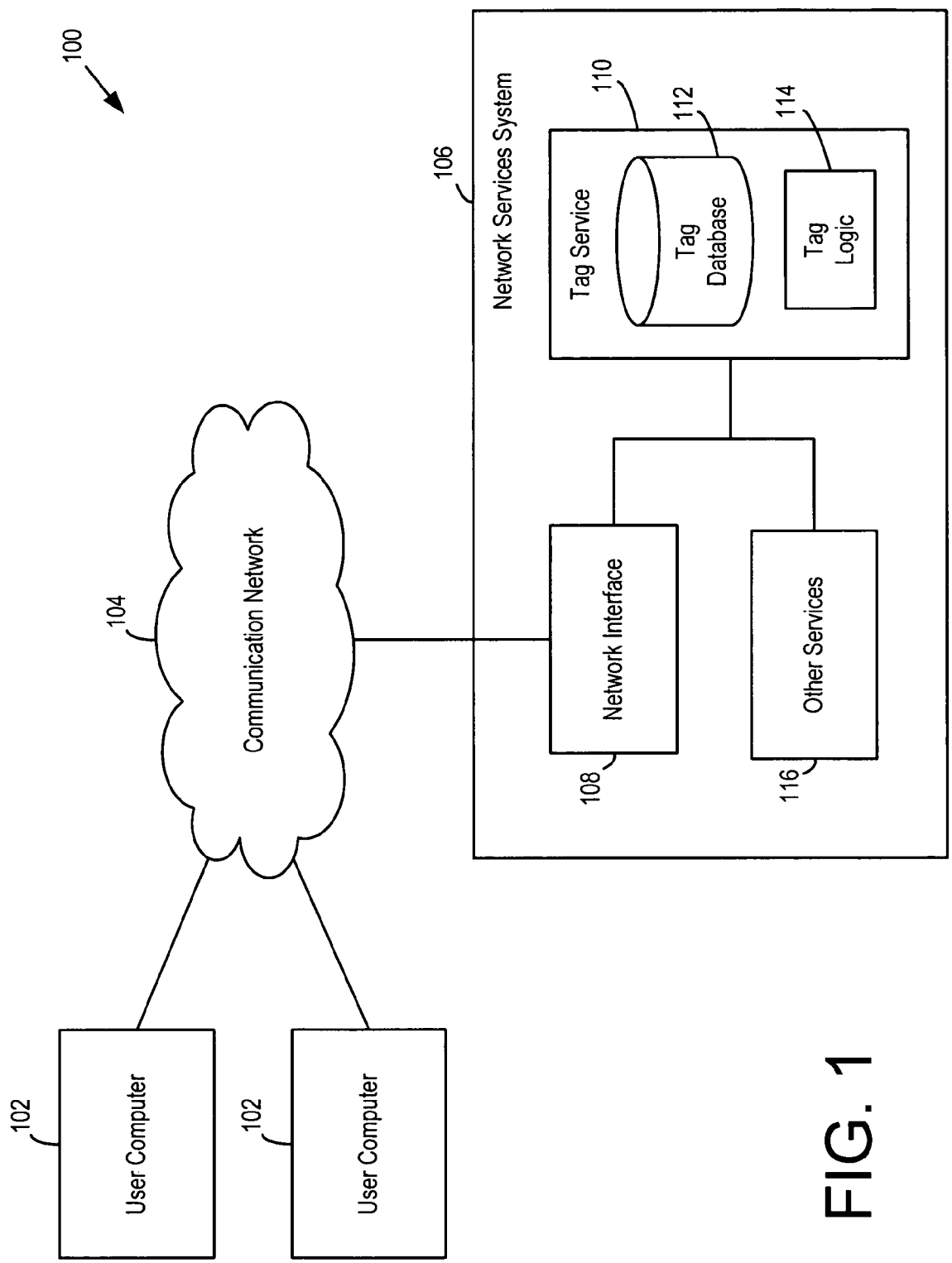
FIG. 1 is a schematic of a tag service according to one embodiment.

Referring to FIG. 1, a system 100 according to one embodiment is shown. System 100 includes one or more user computers 102 connected to network interface 108 by way of a communication network 104, such as the Internet. A network services system 106 may include network interface 108, tag service 110, and other services 116.

Users are able to access network services system 106 and tag service 110 via user computers 102 and communication network 104. Tag service 110 may be provided in a variety of environments. For example, a network interface such as a web page may be intended primarily to allow users to "tag" other web pages, and categorize and search web pages according to the tags assigned to web pages by the user and other users. Alternatively, a web page may be used as a display for a web-based retail store, where tags may be provided as a part of the retailer's overall business intended to make the shopper's experience easier and more enjoyable.

Tag service 110 includes tag database 112 and tag logic 114. Tag database 112 stores, or includes, information associated with the tags assigned to various items by users of tag service 110. Tag logic 114 is used to process information received from users of tag service 110 in order to, among other things, evaluate (e.g., generate composite scores for) the various tags and generate displays of tag options to users wishing to tag items.

Figure 2:
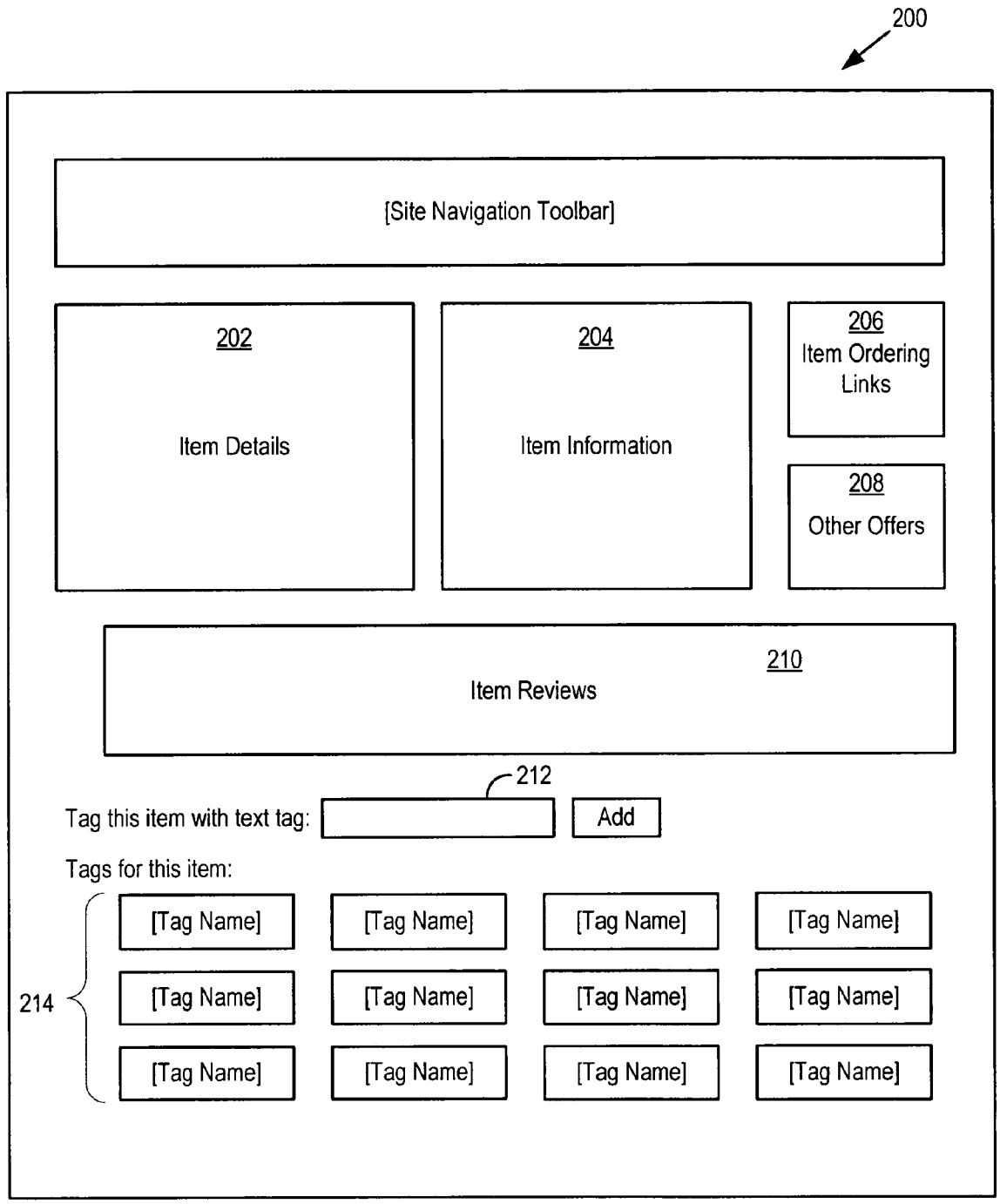
FIG. 2 is a screenshot illustrating a display of an item available for tagging according to one embodiment.

Referring to FIG. 2, a display 200 including information related to an item to be tagged is shown. Display 200 may include item details 202 (e.g., an item photograph and/or other details), item information 204 (e.g., pricing, shipping, availability, and other information), item ordering links 206, other offers 208, and item reviews 210. This information may be presented, for example, as part of a web page of a web-based retailer selling the item. As shown in FIG. 2, display 200 also includes tag text box 212 and tag options 214. Tag logic 114 may receive text, typed or otherwise input by a user, via text box 212 to be assigned as a tag to an item. Options 214 represent tags that are associated with the item, for example, by having been previously assigned to the item. In FIG. 2, tag options 214 are assumed to include all of the tags that have been previously assigned to the item, presented in no particular order.

Figure 3:
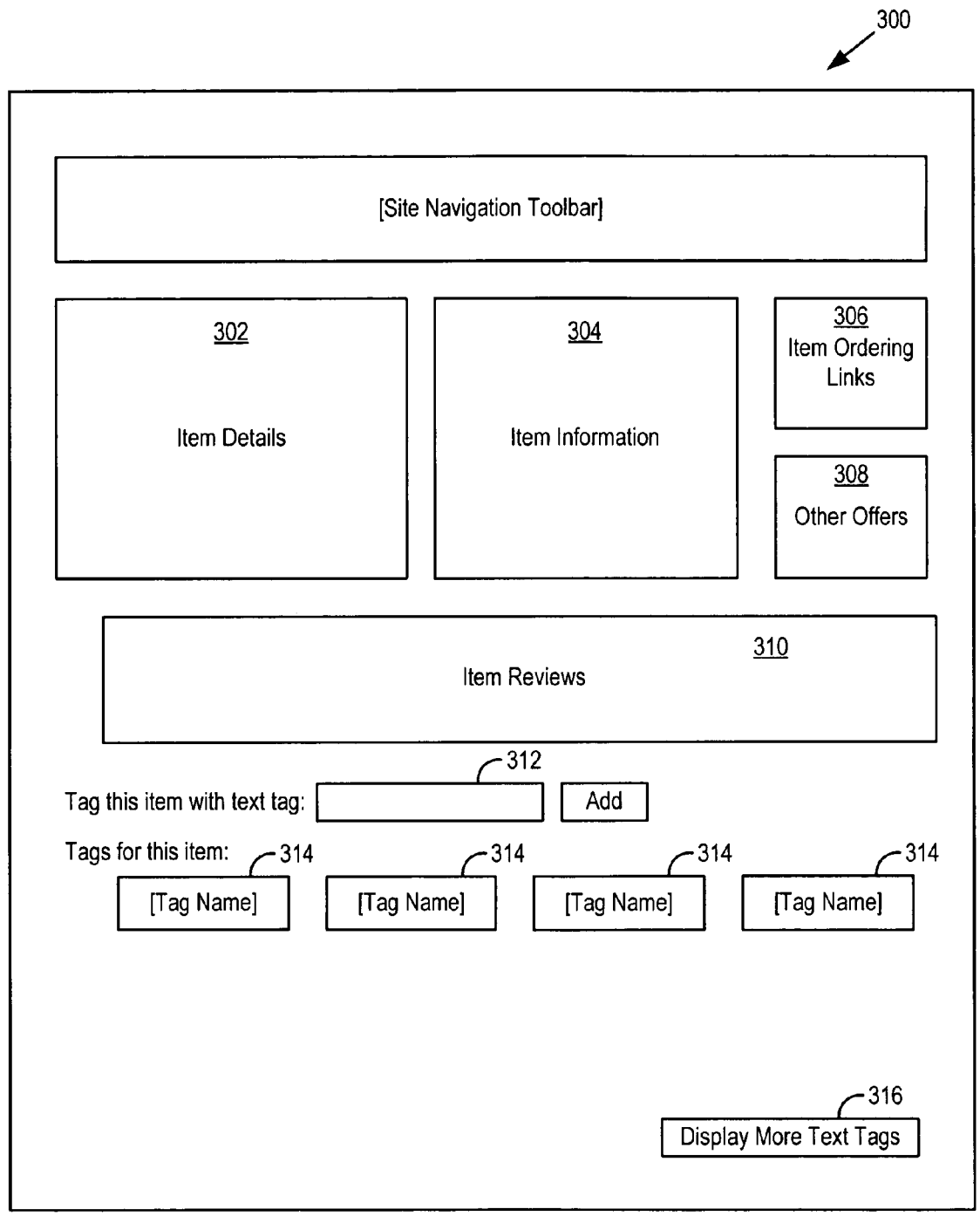
FIG. 3 is a screenshot illustrating a display of an item available for tagging according to one embodiment.

Referring now to FIG. 3, a display 300 containing an item to be tagged according to one embodiment is shown. Display 300 is similar to display 200, except that display 300 contains tag options 314 which, unlike options 214, are selected by applying tag logic 114 to evaluate the tags assigned to an item. For example, display 200 (see FIG. 2) shows twelve (12) options 214 as being presented to a user of the tag service. In contrast, display 300 shows only four (4) options 314 as being presented to a user of tag service 110. Options 314 may be a subset (e.g., one, some, or all) of the options shown in display 200 (see FIG. 2), only options 314 may be displayed in a different order, with more options 314 being available via a user selecting option 316.

As shown in FIG. 3, options 314 represent those tags that are associated with the item and have been evaluated by tag logic 114 and displayed according to the evaluation. Tags may be associated with items in a variety of ways, including being assigned to an item by a user, being designated as a keyword for the item, being indirectly associated with the item (e.g., through a hierarchical relationship of items and/or tags), etc. Tag logic 114 may evaluate (e.g. rank, etc.) the tags to determine their usefulness to users. According to one embodiment, tags may be evaluated on the basis of composite scores for the tags. A composite tag score allows tag logic 114 to select and display a potentially limited number of tags from the total number of tags assigned to an item, e.g., to permit the tags with the higher composite tag scores to be, displayed to users more frequently, more prominently, and/or rather than those with lower composite tag scores. A composite tag score is a score that may be calculated from one or more subscores (e.g., tag metrics, tag variables, etc.). Each individual tag may have its own composite tag score. According to one embodiment, the composite tag score for a tag may represent the quality or usefulness of the tag, as determined by considering one or more various tag metrics. The composite tag score may also represent the probability of a future user assigning a particular tag to an item. Displaying higher quality tags more frequently and/or prominently may increase the usefulness of the overall set of tags and the tag service in general.

Figure 4:
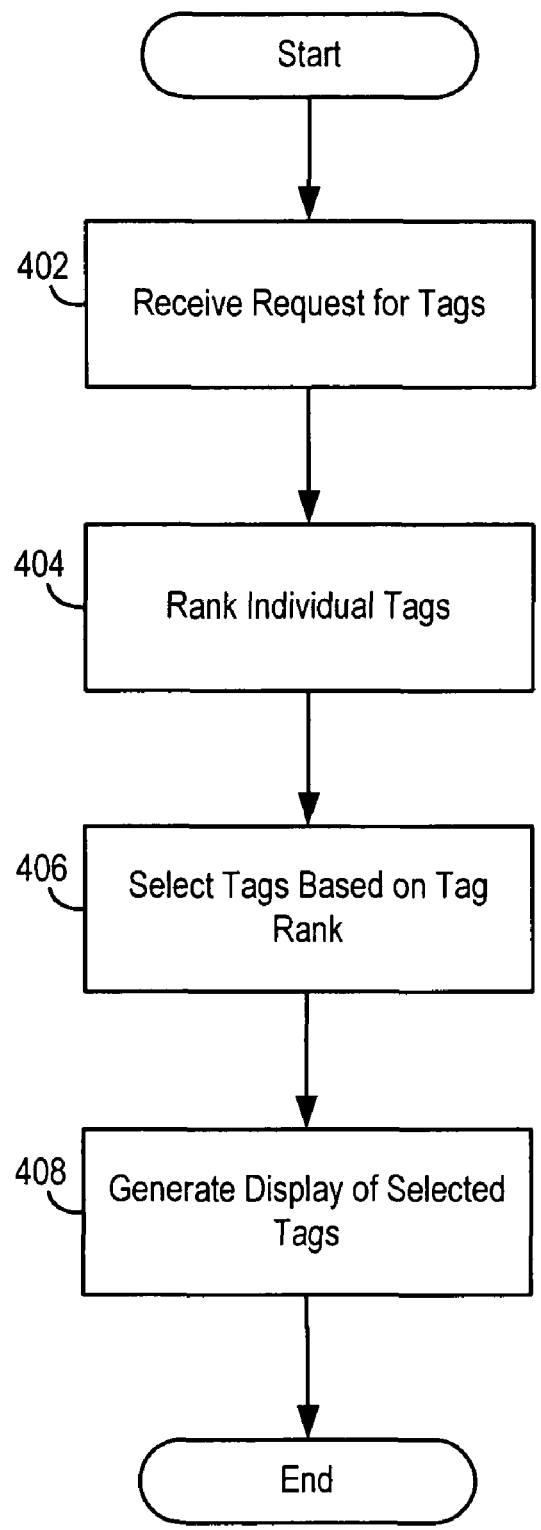
FIG. 4 is a flowchart illustrating the process of displaying tags for an item based on tag rank according to one embodiment.

Referring to FIG. 4, a flowchart illustrating the process of evaluating, selecting, and generating a display of tags (e.g., a subset of tags such as tag options 314 shown in FIG. 3) based on tag rank is shown in greater detail. At step 402, tag logic 114 receives a request for tags for an item. Receiving a request for tags may comprise receiving a specific request for tags for an item, receiving a request for a display page for an item (with associated tags) offered for sale by a network-based retailer, and so on. Other means of receiving a request for tags may also be used.

At step 404, tag logic 114 ranks each of the individual tags associated with the item. According to one embodiment, ranking each tag includes generating a composite score for each tag. For example, if ten (10) tags are associated with the item, tag logic 114 may generate ten (10) composite tag scores (i.e., one for each tag) at step 404. Alternatively, tags may be ranked on the basis of individual tag metrics. According to one embodiment, the tags associated with an item are those tags that are assigned to the item by users. Sample methods for generating a composite tag score and/or individual tag metrics are discussed in greater detail with respect to FIGS. 5-11.

At step 406, tag logic 114 selects a subset of the tags, based at least in part on the rank of each tag, to be displayed to the user. Various criteria may be used to select the tags to be displayed to the user, including ranking the tags according to the composite tag scores, and then selecting, for example, only a given number of the top ranked tags, a given percentage of the top ranked tags, or those tags with a composite tag score exceeding a minimum threshold score. The subset may contain fewer than all of the tags associated with the item, or the subset may contain all of the tags associated with the item.

According to another alternative embodiment, tag logic 114 selects tags on a random basis. For example, each tag assigned to an item may initially have an equal, base probability of being displayed to a user wishing to tag the item. Tag logic 114 may determine the composite tag scores for each of the tags assigned to the item, and increase or decrease the base probability for each tag based on the tag's composite tag score. Thus, tags with low composite scores (that may otherwise not be displayed using, for example, a minimum score threshold) may still be presented to users, only at a lower statistical rate. Other methods of selecting the tags to be displayed to the user may also be used. For example, according to yet another embodiment, tag logic 114 selects all of the tags for an item, regardless of rank, with lower ranked tags then being displayed less prominently (e.g., further down on the display page, on a different display page, and so on).

At step 408, a display of the selected tags (e.g., a subset of tags) is generated. According to one embodiment, the tags are each represented by a similar computer-generated icon containing, for example, the text of the tag, and the icons are displayed in order of composite tag score (see, for example, FIG. 3). According to another embodiment, the tags are represented by computer-generated icons sorted alphabetically according to the text of the tag, with those icons representing tags with higher ranks (e.g., composite scores) being displayed more prominently, e.g., using a visual indication such as highlighting. Other methods of displaying the tags may also be used. For example, the number of tags presented at any one time may be limited, with the user being provided with an option to request additional tags to be displayed.

Figure 5:
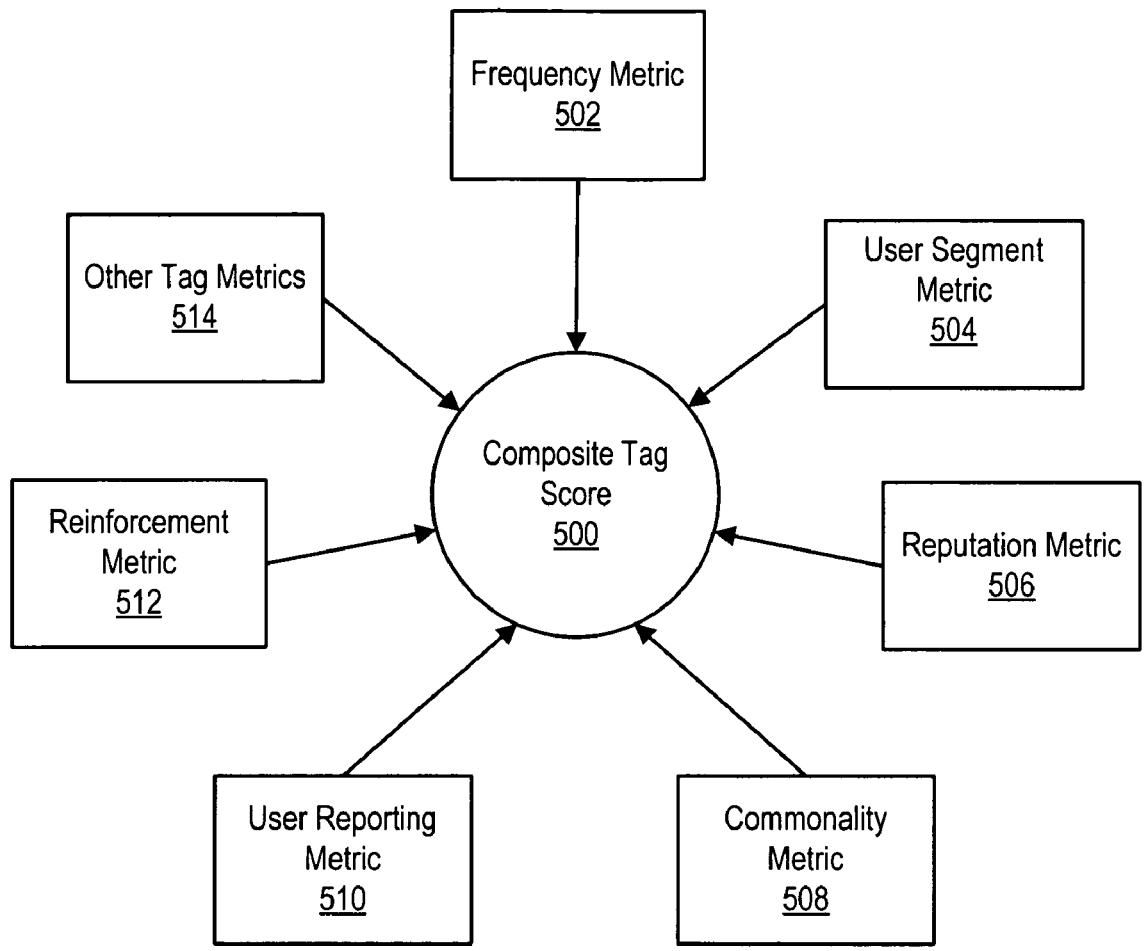
FIG. 5 is a schematic illustrating the composite score for a tag according to one embodiment.

Referring to FIG. 5, various tag metrics that may be included in a composite tag score according to one embodiment are shown. FIG. 5 includes composite tag score 500, and various tag metrics (i.e., subscores, variables, factors, etc.) arranged around the periphery of composite score 500. The tag metrics may include any of a number of quantifiable metrics used to generate composite score 500. Composite tag score 500 may be a function of one, some, or all of the tag metrics shown or others available. For example, composite tag score 500 may be based on a single metric. Alternatively, a combination of metrics may be used to generate composite tag score 500, permitting different types of information to be taken into account in assessing the usefulness of the tag. As shown in FIG. 5, the various tag metrics may include a frequency metric 502, a user segment metric 504, a reputation metric 506, a commonality metric 508, a user reporting metric 510, a reinforcement metric 512, and other tag metrics 514.

According to one embodiment, the composite tag score is a weighted average of the various tag metrics. Each of the individual tag metrics may be assigned a weighting coefficient which determines the weight that the specific metric is given in determining the composite tag score.

According to another embodiment, the composite tag score is created using a common logistical regression technique to link a dependent variable (e.g., the composite tag score) and a set of explanatory variables (e.g., various tag metrics). The explanatory variables may be any of a wide variety of tag variables, and different numbers of variables may be used. Preferably, the tag variable types and the number of tag variables are chosen so as to enhance the predictive value of the composite tag score value produced.

Examples of different types of models that may be used include log-linear, logit and probit models. For example, a logit model may be used that links the set of explanatory variables with the probability that a user will select the tag. The logit model has the following form:

$$\text{Tag\_Score}_n = \frac{e^{X_n \beta}}{1 + e^{X_n \beta}} \quad \text{Eq. (1)}$$

In Equation (1), X is a vector representing the explanatory tag variables, $\beta$ is a vector representing parameters or weighting coefficients of the model, the subscript n specifies a particular tag, and Tag_Score is the score that is assigned to the tag representing the probability that a user to whom the tag is displayed will select the tag (e.g., click on it). For example, if there are K tag variables (X) and N number of tags, then there are K×N different values of X for the N tags:

$$X_{1,1} \quad \cdots \quad X_{K,1}$$
$$\cdots \quad \quad \cdots$$
$$X_{1,N} \quad \cdots \quad X_{K,N}$$

The K tag variables (X) associated with a particular tag n represent a vector of control variables $X_n$ of the form:

$$X_{1,n} \ldots X_{K,n}.$$

Similarly, $\beta$ in Eq. (1) represents the model parameters or weighting factors $\beta_1$ through $\beta_K$ for all of the tag variables X, $X_1$ through $X_K$, in this example. Equation (1) may therefore be rewritten in longer form as follows:

$$\text{Tag\_Score}_n = \frac{e^{(X_{1,n}\beta_1 + X_{2,n}\beta_2 + \ldots + X_{K,n}\beta_K)}}{1 + e^{(X_{1,n}\beta_1 + X_{2,n}\beta_2 + \ldots + X_{K,n}\beta_K)}}. \quad \text{Eq. (2)}$$

It will be appreciated that variable definitions and equations used herein are merely illustrative and other specifications may be used.

In one embodiment, seven tag metrics (i.e., K=7) are used in determining Tag_Score, including a frequency metric, a user segment metric, a reputation metric, a commonality metric, a user appeal metric, and a reinforcement metric. For each metric, tag logic 114 may store the metric along with other tag information in tag database 112. To determine an optimal set of coefficients based on past performance data (e.g., the seven explanatory variables), the coefficients $\beta$ are selected which minimize the generalized error (e.g., mean squared error) in the model in predicting the likelihood that the user will select the tag. Logistic regression estimation techniques are used, such as maximum likelihood. Thus, an initial set of $\beta$ coefficients are first computed, and then additional sets of $\beta$ coefficients are iteratively computed until a set of $\beta$ coefficients is arrived upon that is considered to be the most optimal set of $\beta$ coefficients. This is a readily available procedure in many statistical programming languages and commercial software packages, such as PROC LOGISIC in SAS®.

Sample tag metrics and an illustrative process for determining each will now be described in greater detail below with respect to FIGS. 6-11. The various tag metrics may be used individually or in combination to rank tags and/or generate composite scores for tags. In each of FIGS. 6-11, the flow charts illustrate the processes of determining various tag metrics upon receiving a request for tags for an item from a user.

Figure 6:
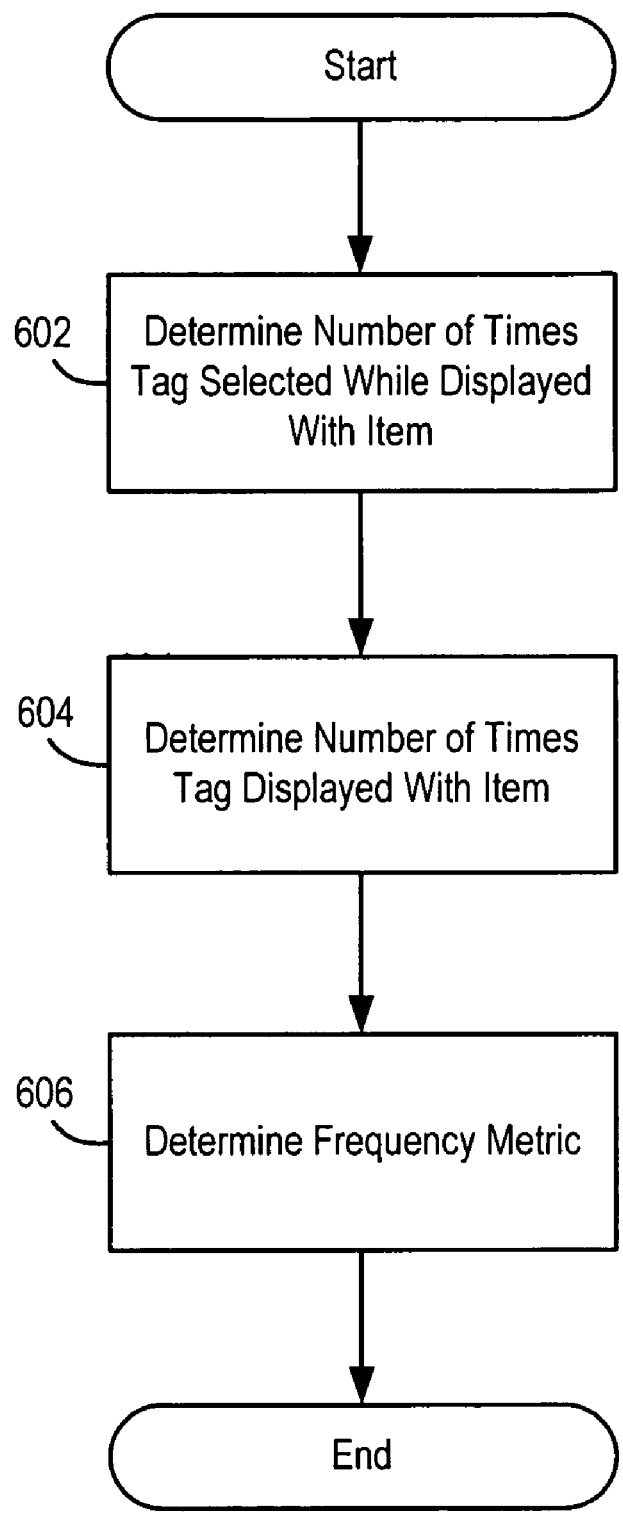
FIG. 6 is a flowchart illustrating the process of determining a frequency metric for a tag according to one embodiment.

Referring to FIG. 6, a flowchart showing a sample process of determining the frequency metric for a given tag is illustrated. The frequency metric indicates the usage rate of a tag. According to one embodiment, the frequency metric is determined by the past usage of a tag. For example, the frequency metric may increase with each time the tag is used by various users of tag service 110. Alternatively, the frequency metric may represent a usage ratio of, for example, the number of times the tag has been selected (e.g., clicked on) relative to the number of times the tag has been displayed as a tag option for the item to users. Such a usage ratio may permit, for example, newer tags (e.g., recently created tags) that may have a low total usage, but are used a high percentage of the time they are displayed, to be displayed more often than would otherwise be possible if only a total usage frequency metric is used.

At step 602, tag logic 114 determines the number of times the tag has been selected by users of tag service 110. At step 604, tag logic 114 determines the number of times the tag has been displayed with the item to users of tag service 110. At step 606, tag logic 114 determines the frequency metric based on the ratio of the number of times the tag has been selected relative to the number of times the tag has been displayed with the item. As discussed above, other ratios and/or methods of calculating the frequency metric may also be used.

Figure 7:
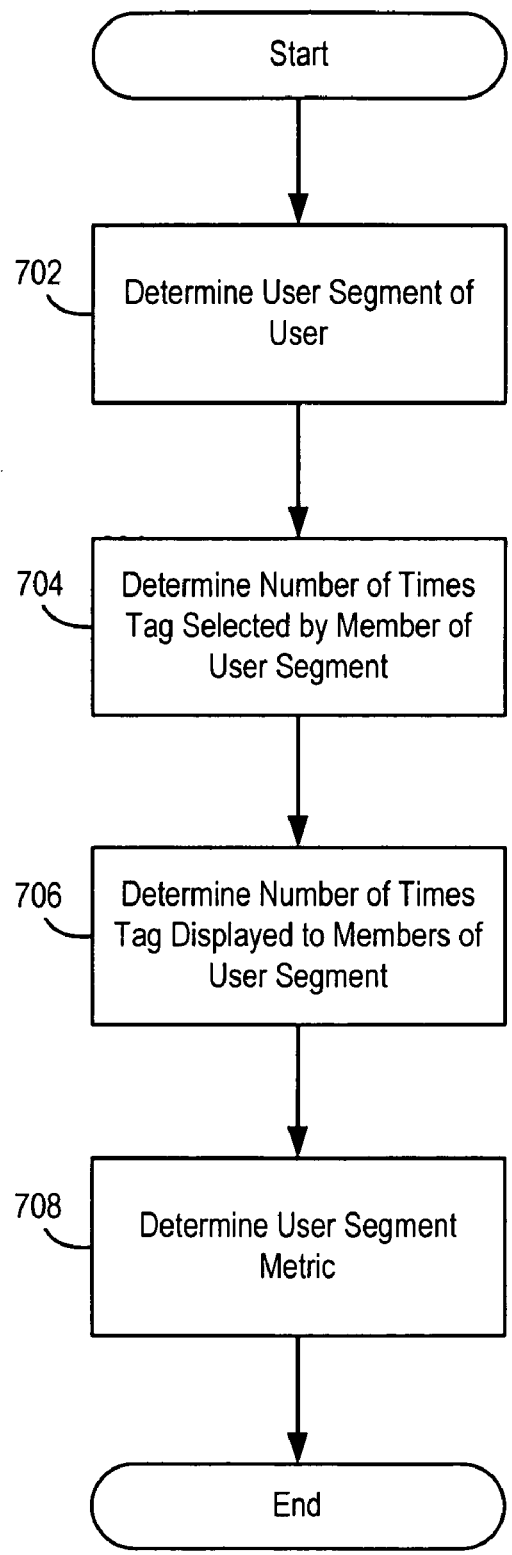
FIG. 7 is a flowchart illustrating the process of determining a user segment metric for a tag according to one embodiment.

Referring to FIG. 7, a flowchart showing a sample process of determining the user segment metric for a given tag is illustrated. The user segment metric indicates the usage of a tag within particular user segments (i.e., niches, demographic segments, etc.). The user segment takes into account, among other factors, the user segment to which a current user belongs and the fact that certain tags may be more popular, useful, etc., to certain segments of users. For example, users within a certain age group may use similar slang terms that are unpopular with or even unknown to persons outside the age group. While the usage (e.g., the frequency metric) of a slang term as a tag may be relatively low (as compared to other tags assigned to the item), the relative usage of the tag within a particular user segment (e.g., age range) may be significantly higher. The user segment metric allows tag logic 114 to take this into account to preserve and present tag options that may be uniquely relevant to members of a particular user segment.

The actual user segment may be defined in a variety of ways, including age, gender, geographic location, purchasing history, etc. Other means of defining a user segment may alternatively be used. The user segment metric may likewise be determined in a number of ways. According to one embodiment, the user segment metric for a tag displayed for an item represents the ratio of the number of times a particular tag is selected by users belonging to a user segment relative to the number of times the tag is displayed to members of the user segment.

At step 702, the user segment of the user is determined. According to one embodiment, information related to a user's user segment may be provided during an initial registration process for tag service 110. Tag logic 114 may use other means to determine user segments of various other users (including users that may not be registered with tag service 110). At step 704, tag logic 114 determines the number of times the tag has been selected by a member of the user segment. At step 706, tag logic 114 determines the number of times the tag has been displayed to members of the user segment. At step 708, tag logic 114 determines the user segment metric based on the ratio of the number of times the tag has been selected by a member of the user segment relative to the number of times the tag has been displayed with the item to a member of the user segment. Other methods of calculating the user segment metric may also be used.

It should be understood that a single tag and/or user may be associated with various user segments, and therefore have various user segment metrics, each of which may contribute to the tag rank and/or the composite tag score, depending on the user. According to one embodiment, if tag logic 114 cannot identify a user as a member of a user segment, a default value for the user segment metric may be used, or the user segment metric may be omitted from the ranking of the tag.

Figure 8:
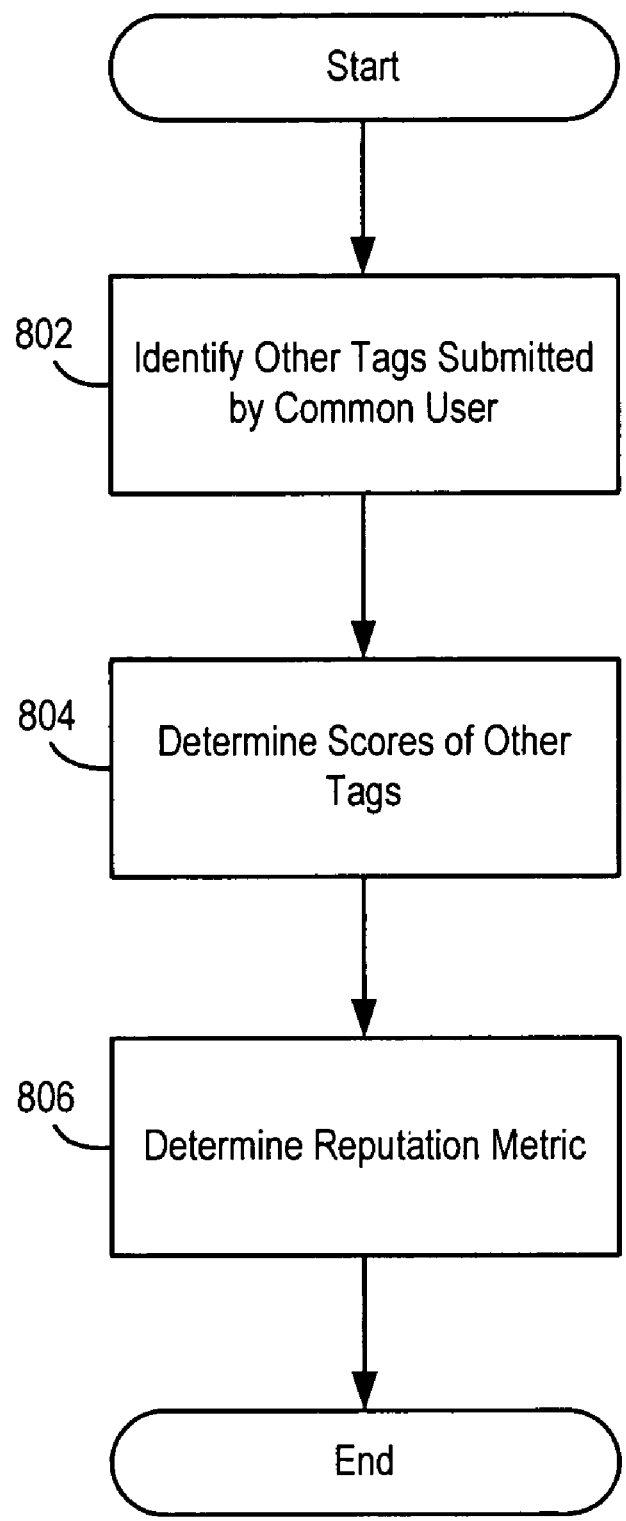
FIG. 8 is a flowchart illustrating the process of determining a reputation metric for a tag according to one embodiment.

Referring to FIG. 8, a flowchart showing a sample process of determining the reputation metric for a tag is illustrated. The reputation metric for a tag indicates the "success" (e.g., the composite tag score(s)) of "sibling" tags (e.g., other tags submitted by the same user). For example, if a particular tag is entered by a user, and the user has previously submitted another tag that has, a high composite tag score, the reputation metric for the newly entered tag will be increased (or, potentially, decreased in the case of a low composite tag score for the other tag(s)). The reputation metric of a tag is thus a function of, or proportional to, the performance (e.g., the composite tag scores) of other tags submitted by the same user(s) that submitted the tag.

At step 802, tag logic 114 identifies any other tags (e.g., tags other than the One being scored) that have been submitted by a common user. At step 804, tag logic 114 determines the scores of any of the tags identified as having been submitted by a common user, e.g., using any one or combination of scoring methods described herein. At step 806, tag logic 114 determines the reputation metric for the tag based on the composite scores of the other tags identified as having been submitted by a common user. According to one embodiment, the reputation metric will increase or decrease according to the composite scores of the other tags identified by tag logic 114. Other methods of determining the reputation metric may also be used.

Figure 9:
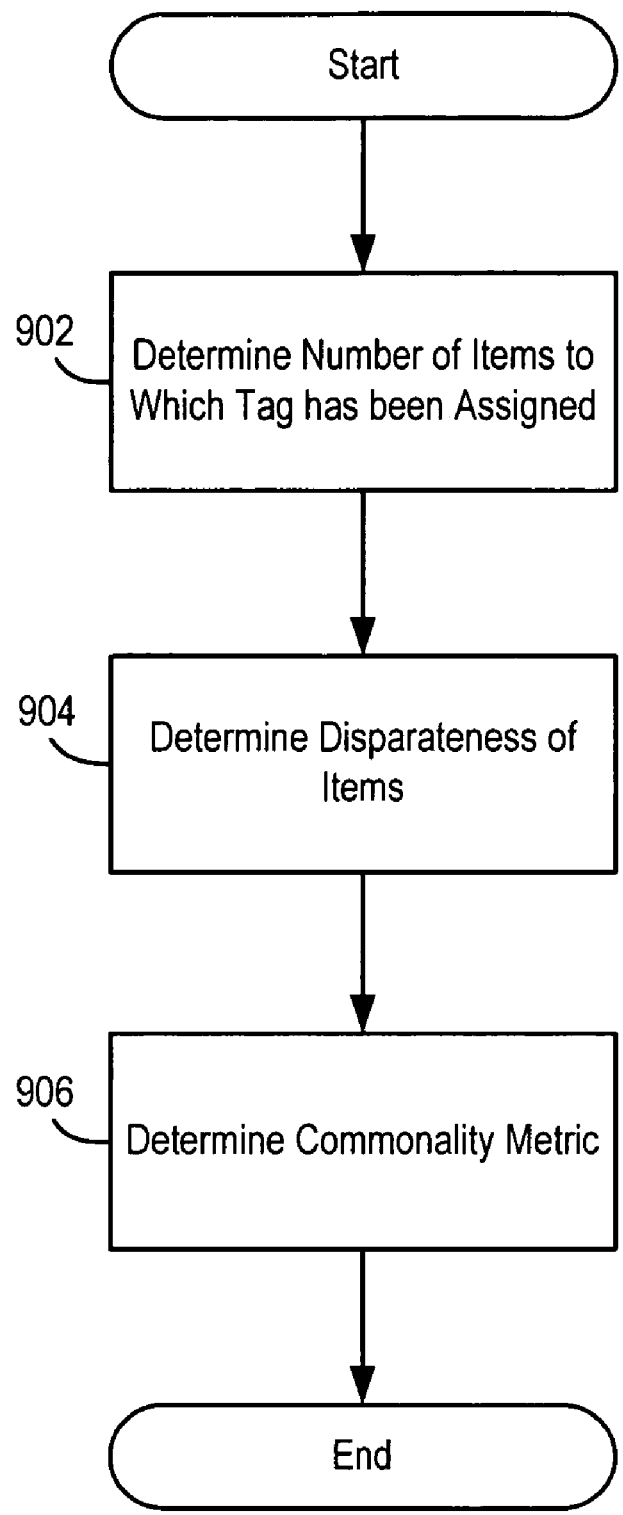
FIG. 9 is a flowchart illustrating the process of determining a commonality metric for a tag according to one embodiment.

Referring to FIG. 9, a flowchart showing a sample process of determining the commonality metric for a given tag is illustrated. The commonality metric indicates the number and disparateness of items to which a particular tag has been assigned. The commonality metric is based, in part, on the idea that a tag that is overused (e.g., assigned to a multitude of items or to a number of unrelated items), as a result may become less useful in terms of tag-based searching, categorization, etc. For example, if the tag "book" is assigned to five-hundred (500) different books at a network-based bookstore, the tag may not be helpful when conducting, for example, a tag-based search query for a book on a particular subject matter. Similarly, if a tag is assigned to various totally unrelated items (e.g., a boat, a watch, and a dog, all tagged with the term "dad"), the tag may become similarly unhelpful.

At step 902, tag logic 114 identifies the number of items to which the tag has been assigned. At step 904, tag logic 114 determines the disparateness of the items. The disparateness of the items may be determined in various ways. For example, a network-based retailer may utilize a subject matter taxonomy to classify items. The taxonomical relationship of the various items may be used to represent the disparateness of the items. At step 906, tag logic 114 determines the commonality metric based on the disparateness of the items and/or the total number of items to which the tag is assigned. Other methods to determine the commonality metric may also be used.

Figure 10:
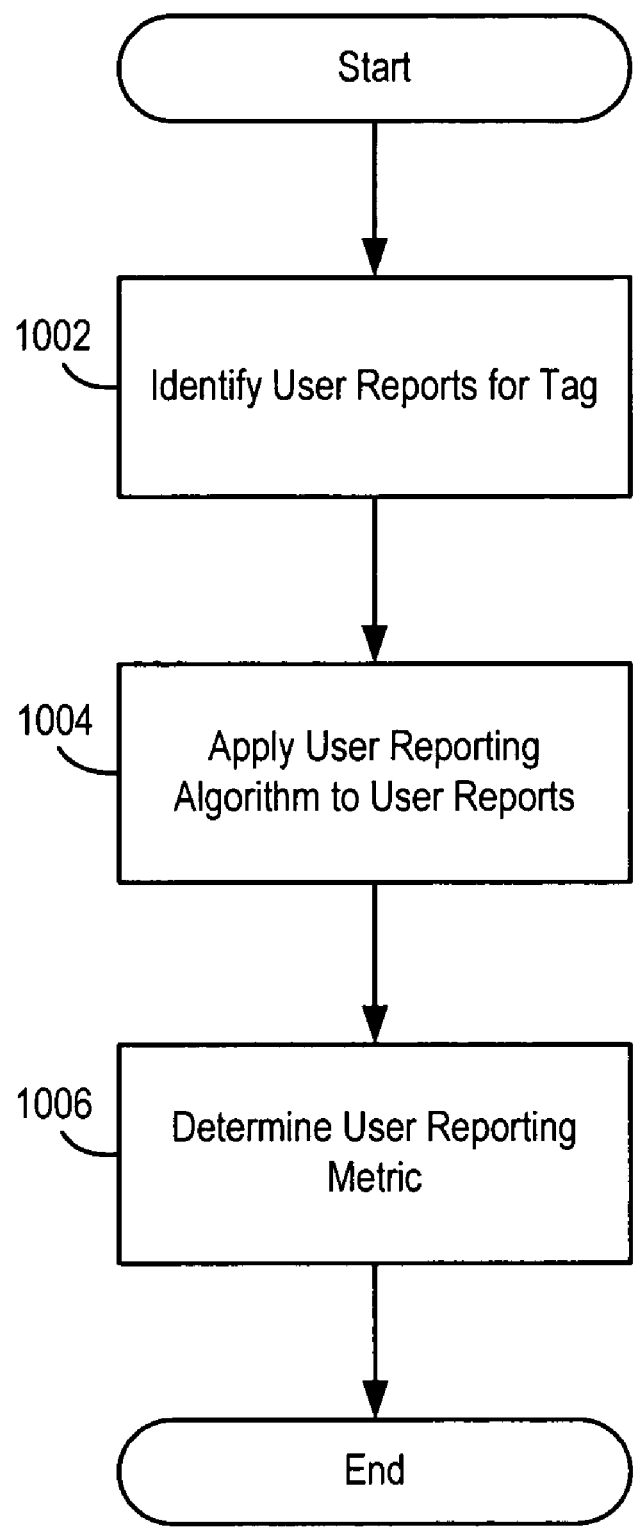
FIG. 10 is a flowchart illustrating the process of determining a user reporting metric for a tag according to one embodiment.

Referring to FIG. 10, a flowchart showing a sample process of determining the user reporting metric for a given tag is illustrated. The user reporting metric takes into account reports received from users regarding specific tags and their appeal to various users. For example, tag service 110 may provide users with the ability to notify tag service 110, via user reports, of any inappropriate or offensive tags (e.g., a tag containing offensive language). User reports may be generated, for example, by providing an icon on a web page that automatically sends a user report to tag logic 114 upon being selected. For example, the user reports may be a simple confirmation in response to a question (e.g., "Does this tag contain offensive material?"). The user reporting metric allows tag service 110 to decrease the frequency of, or even eliminate, the presentation of offensive, inappropriate, or otherwise unappealing tags to users. According to an alternative embodiment, the user reporting metric may generate a rank (e.g., 1 to 5) for a tag, with only those tags having certain ranks being displayed.

At step 1002, tag logic 114 identifies the user reports (if any) that have been submitted for the tag. As discussed, the user reports may be generated in a variety of ways and be in a variety of formats. At step 1004, tag logic 114 applies a user reporting algorithm to the user report(s) to determine user appeal of the tag. For example, tag logic 114 may analyze user reports to identify tags containing offensive material, and may determine that certain tags should not be displayed to users. At step 1006, tag logic 114 determines the user reporting metric based on user appeal of the tag. Other methods of determining the user reporting metric for a tag may also be used.

Figure 11:
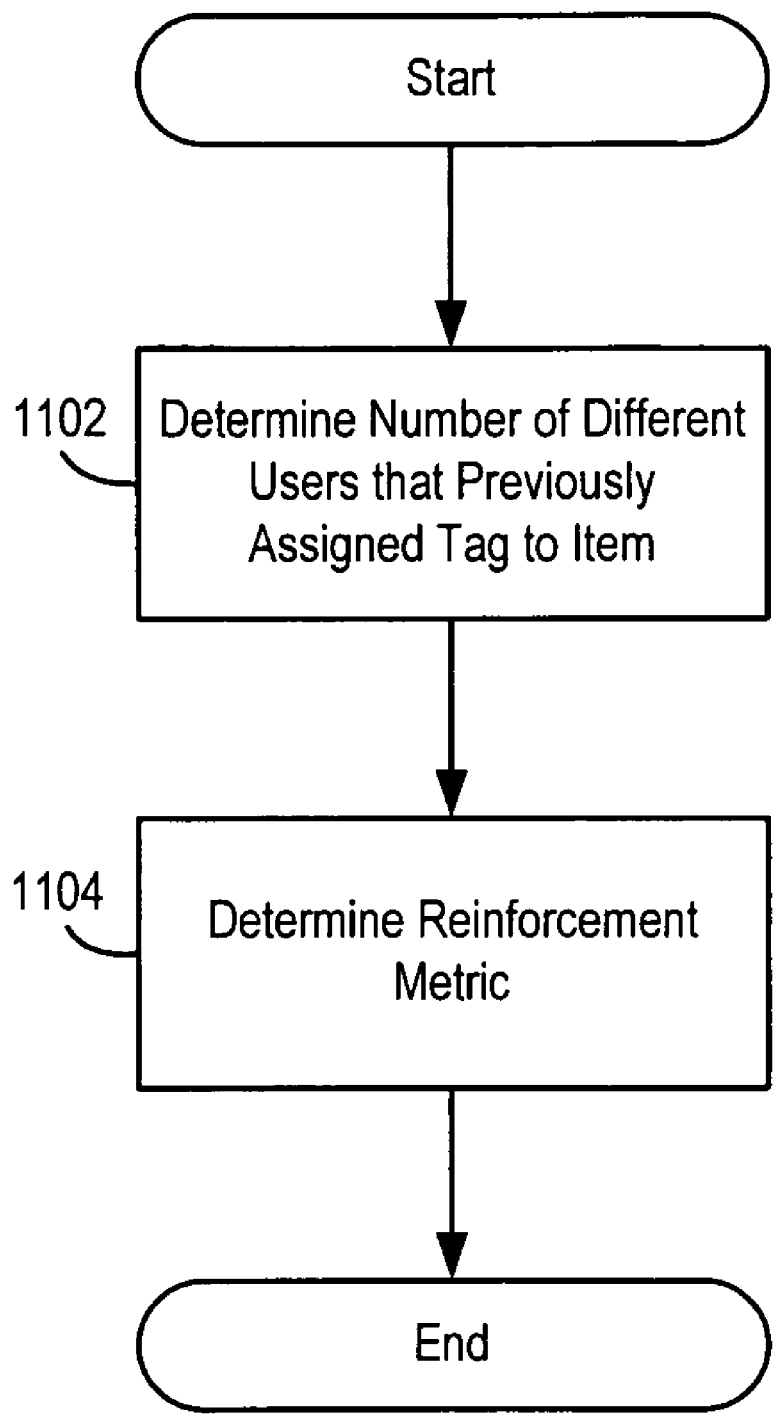
FIG. 11 is a flowchart illustrating the process of determining a reinforcement metric for a tag according to one embodiment.

Referring to FIG. 11, a flowchart showing a sample process of determining the reinforcement metric for a tag is illustrated. The reinforcement metric takes into account the number of different users that have assigned a tag to a particular item. The reinforcement metric is based, in part, on the idea that the number of different users assigning a tag to an item reinforces the usefulness and/or helpfulness of the tag, and the tag may therefore be useful to yet additional users. For example, if twenty (20) people have tagged an item, and ten (10) of the people use an identical tag, tag logic 114 may increase the reinforcement metric to indicate that the tag may also be useful to additional users (e.g., more useful than other tags assigned to the item). According to one embodiment, the reinforcement metric is based on the total number of different users that have assigned the tag to the item.

At step 1102, tag logic 114 determines how many other users have assigned the tag to the item. At step 1104, tag logic 114 generates the reinforcement metric based on the total number of users that have assigned the tag to the item. According to one embodiment, various methods known to those skilled in the art may be used to ensure that different users are actually different persons (e.g., to avoid the case of a single person tagging an item multiple times using different usernames, thereby potentially artificially inflating the reinforcement metric).

It should be understood that the various tag metrics disclosed herein may be calculated by tag logic 114 at various times, in succession or simultaneously, and may be used in combination to form other tag metrics not specifically described herein. For example, the user segment metric may be applied in combination with another tag metric to provide a refined calculation of the other metric (e.g., the reinforcement metric) within a particular user segment. Further, the various tag metrics may be used in a variety of ways to evaluate tags, including generating composite tag scores using various models, such as those discussed with respect to FIG. 5. Other tag metrics and methods for determining the composite tag score may also be used.

Here and throughout, terms such as "web page," "website," and so forth are used to give specific illustrative examples of settings in which on-line content can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including, machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

A system for implementing the overall system or portions of the invention might include a general purpose computing device in the form of a computer, including a processing unit, a system memory, and a system bus that couples various system components including the system memory to the processing unit. The system memory may include read only memory (ROM), and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented system for evaluating tags for an item, comprising:
    one or more processors;
    a tag database for storing information regarding a plurality of tags, the plurality of tags being associated with the item;
    tag logic in communication with the tag database and comprising machine-executable instructions that, when executed on the one or more processors:
        identify members of a user segment of multiple different user segments, each member of the user segment sharing a common characteristic;
        determine a number of times the members of the user segment have selected each tag of the plurality of tags while the respective tag is displayed with the item;
        determine a number of times each respective tag has been displayed with the item to the members of the user segment; and
        display a subset of the plurality of tags in a manner determined based at least in part on the determined number of times that the members of the user segment have selected each tag relative to the number of times that the tag has been displayed with the item to the members of the user segment.

2. The system of claim 1, wherein the tag logic is further configured to receive a request for the display of the subset of tags from a user that is a member of the user segment.

3. The system of claim 1, wherein the common characteristic comprises an age, a gender, a location, or a purchasing history.

4. The system of claim 1, wherein the tag logic is further configured to:
    receive a request from a user for the display of the subset of tags;
    identify a tag that the user has assigned to a different item; and
    determine a performance of the tag that the user has assigned to the different item;
    and wherein the displaying of the subset of tags is also based at least on part on the determined performance of the tag that the user has assigned to the different item.

5. The system of claim 1, wherein the tag logic is further configured to:
    identify a plurality of other items to which the tag is assigned; and
    determine the disparateness of the plurality of other items;
    and wherein the displaying of the subset of tags is also based at least in part on the determined disparateness of the plurality of other items.

6. The system of claim 1, wherein the tag logic is further configured to:
    receive a user report for the tag; and
    apply a user reporting algorithm to the user report to determine user appeal of the tag;
    and wherein the displaying of the subset of tags is also based at least in part on the determined user appeal of the tag.

7. The system of claim 1, wherein the tag logic is further configured to determine a number of distinct users that have assigned the tag to the item, and wherein the displaying of the subset of tags is also based at least in part on the determined number of distinct users that have assigned the tag to the item.

8. The system of claim 1, wherein the subset of the plurality of tags includes less than all of the plurality of tags.

9. The system of claim 1, wherein the subset of the plurality of tags is displayed in an order determined based at least in part on the determined number of times that the members of the user segment have selected each tag relative to the number of times that the tag has been displayed with the item to the members of the user segment.

10. A computer-implemented method for displaying tags for a first item, the method comprising:
    storing a plurality of tags in a tag database, the plurality of tags being assigned to the first item;
    receiving a request for the first item from a user;
    identifying a tag that the user has assigned to a second, different item;
    ranking the tag that the user has assigned to the second item relative to other tags assigned to the second item;
    ranking the plurality of tags assigned to the first item based at least in part on the ranking of the tag that the user has assigned to the second item; and
    displaying a subset of the plurality of tags to the user in a manner determined based at least in part upon the ranking of the plurality tags assigned to the first item.

11. The method of claim 10, further comprising determining a number of times that each of the plurality of tags assigned to the first item has been selected while displayed with the first item, and wherein the ranking of the plurality of tags assigned to the first item is also based at least in part on the determining.

12. The method of claim 11, wherein the determining comprises determining the ratio of the number of times that each tag has been selected while displayed with the first item relative to the number of times the respective tag has been displayed with the first item.

13. The method of claim 10, further comprising:
    classifying the user as a member of a user segment, the members of the user segment sharing a common characteristic;
    determining a first factor as a function of a number of times the tag has been selected by members of the user segment while displayed with the first item; and
    determining a second factor as a function of a number of times the tag has been displayed to members of the user segment;
    and wherein the ranking of the plurality of tags assigned to the first item is also based at least in part on the first and second factors.

14. The method of claim 13, wherein the ranking is based at least in part on the ratio of the first factor relative to the second factor.

15. The method of claim 13, wherein the common characteristic comprises an age, a gender, a location, or a purchasing history of the user.

16. The method of claim 10, further comprising:
identifying a plurality of other items to which each tag has been assigned; and
determining the disparateness of the plurality of other items;
and wherein the ranking of the plurality of tags is also based at least in part on the determined disparateness of the plurality of other items.

17. The method of claim 10, further comprising:
receiving a user report for a tag of the plurality of tags; and
applying a user reporting algorithm to the user report to determine user appeal of the tag;
and wherein the ranking of the plurality of tags is also based at least in part on the determined user appeal of the tag.

18. The method of claim 10, further comprising:
determining a number of distinct users that have assigned the tag to the item;
and wherein the ranking of the plurality of tags is also based at least in part on the determined number of distinct users that have assigned the tag to the item.

19. The method of claim 10, wherein the subset of tags does not include at least one of the plurality of tags.

20. The method of claim 19, wherein displaying the subset of the plurality tags includes selecting a percentage of the plurality of tags.

21. The method of claim 19, wherein displaying the subset of the plurality tags includes selecting tags having ranks exceeding a minimum threshold rank.

22. The method of claim 19, wherein displaying the subset of the plurality tags includes selecting a predetermined number of the plurality of tags.

23. The method of claim 19, further comprising:
assigning a base probability to each of the plurality of tags;
adjusting the base probability for each of the plurality of tags to an adjusted probability according to the rank for the tag; and
assigning the adjusted probability to the tag;
wherein displaying the subset of the plurality of tags includes selecting tags based on the adjusted probability assigned to each of the plurality of tags.

24. The method of claim 10, wherein displaying the subset of the plurality of tags comprises generating a display of a computer-icon for each tag in the subset and displaying the computer-icons according to the rank for each tag.

25. The method of claim 10, wherein displaying the subset of the plurality of tags comprises:
generating a computer-icon for each tag in the subset;
wherein the prominence of each computer-icon is proportional to the rank of each tag.

26. A computer accessible storage medium whose contents direct a computing system to:
receive a request for an item from a user;
determine multiple tags that have been assigned to the item;
determine, for each of the multiple tags, a plurality of other items to which the respective tag has been assigned;
determine, for each tag, the disparateness of the plurality of other items to which the respective tag has been assigned; and
selectively display the multiple tags assigned to the item based at least in part on the determined disparateness of the plurality of other items assigned to the respective tags of the multiple tags that have been assigned to the item.

27. The computer accessible medium of claim 26, wherein selectively displaying the tags includes displaying less than all of the tags.

28. The computer accessible medium of claim 26, wherein the tags are also selectively displayed based at least in part on a frequency metric, a user segment metric, a reputation metric, a user-reporting metric, or a reinforcement metric.

29. The computer accessible medium of claim 26, wherein selectively displaying the tags includes selecting a predetermined number of tags.

30. The computer accessible medium of claim 26, wherein the tags are displayed in an order based at least in part on the determined disparateness of the plurality of other items assigned to the respective tags of the multiple tags that have been assigned to the item.

31. A computer-implemented method for displaying tags for an item, the method comprising:
storing a plurality of tags in a tag database, the plurality of tags being assigned to the item;
determining, for each tag of the plurality of tags, a number of distinct users that have assigned the respective tag to the item;
ranking the plurality of tags based at least in part on the determined number of distinct users that have assigned each respective tag to the item; and
displaying a subset of the plurality of tags in a manner determined based at least in part upon the ranking of the tags.

* * * * *